(12) United States Patent
Xu

(10) Patent No.: US 11,400,866 B1
(45) Date of Patent: Aug. 2, 2022

(54) CLIP BRACKET FOR AN AIR OUTLET OF AN AUTOMOBILE AIR CONDITIONER

(71) Applicant: SHENZHEN MIRACLE INTELLIGENT TECHNOLOGY CO., LTD, Shenzhen (CN)

(72) Inventor: Yun Xu, Shenzhen (CN)

(73) Assignee: SHENZHEN MIRACLE INTELLIGENT TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/459,489

(22) Filed: Aug. 27, 2021

(51) Int. Cl.
*B60R 11/00* (2006.01)
*B60R 11/02* (2006.01)

(52) U.S. Cl.
CPC ........... *B60R 11/00* (2013.01); *B60R 11/0241* (2013.01); *B60R 2011/0008* (2013.01)

(58) Field of Classification Search
CPC . B60R 2011/0008; B60R 11/00; B60R 11/02; B60R 11/0241
See application file for complete search history.

(56) References Cited

U.S. PATENT DOCUMENTS

| | | | | |
|---|---|---|---|---|
| 5,110,079 | A | * | 5/1992 | Evenson ............... A47F 5/0876 248/222.13 |
| 5,961,083 | A | * | 10/1999 | Hartmann .............. B60N 3/101 248/311.2 |
| D873,261 | S | * | 1/2020 | Yin .............................. D14/253 |
| D891,407 | S | * | 7/2020 | Folk ............................ D14/240 |
| 10,865,514 | B2 | * | 12/2020 | Schwab ................ F26B 25/063 |
| D950,541 | S | * | 5/2022 | Xu ................................ D14/253 |
| 2016/0082893 | A1 | * | 3/2016 | Ormsbee ............ B60R 11/0241 224/558 |
| 2019/0241129 | A1 | * | 8/2019 | Song ................... B60R 11/0241 |
| 2021/0347232 | A1 | * | 11/2021 | Fan ...................... B60H 1/3435 |

FOREIGN PATENT DOCUMENTS

| | | | | | |
|---|---|---|---|---|---|
| CN | 110065446 | A | * | 7/2019 | ............. B60R 11/02 |
| DE | 202020002137 | U1 | * | 7/2020 | |
| EP | 1336535 | A1 | * | 8/2003 | ............. B60R 11/02 |
| KR | 20170022469 | A | * | 8/2015 | |
| KR | 20210127016 | A | * | 10/2021 | |
| WO | WO-2016040910 | A1 | * | 3/2016 | ............... A61L 9/12 |
| WO | WO-2021201717 | A1 | * | 10/2021 | |
| WO | WO-2021217320 | A1 | * | 11/2021 | |

* cited by examiner

*Primary Examiner* — Justin M Larson
(74) *Attorney, Agent, or Firm* — Li & Cai Intellectual Property (USA) Office

(57) ABSTRACT

A clip bracket for an air outlet of an automobile air conditioner comprises: a connecting member; a fixed shell; a guide shaft of which one end is fixedly assembled on the fixed shell and the other end is fixedly assembled on the connecting member; a hook removably assembled on the fixed shell and axially movable only along the guide shaft, and configured to axially fix the clip bracket for an air outlet of an automobile air conditioner to a blade of the air outlet of the automobile air conditioner along the guide shaft; a driving assembly provided on the guide shaft and configured for a user to rotate to drive the hook to axially move along the guide shaft, so as to make the clip bracket for an air outlet of an automobile air conditioner to be axially fixed to the blade along the guide shaft.

8 Claims, 4 Drawing Sheets

CLIP BRACKET FOR AN AIR OUTLET OF AN AUTOMOBILE AIR CONDITIONER

FIELD OF THE DISCLOSURE

The present disclosure relates to the technical field of automobile supplies, in particular, to a clip bracket for an air outlet of an automobile air conditioner.

BACKGROUND OF THE DISCLOSURE

Since the launch of smartphones and tablets, they have been updated very quickly, with more and more functions. Many tasks in life can be handled through mobile phones, and the functions of taking pictures and video and audio have become more and more powerful. They have already carried most of the daily pictures. The functions of video and playback have become very important tools for learning and entertainment. Mobile phones have been deeply embedded in people's lives. In modern society, cars are also important supplies for people's lives and work. As the pace of life accelerates and communication becomes more frequent, people often have to use mobile phones in cars. However, when using a mobile phone in a car, the driver can only operate the mobile phone with one hand, but the large screen of the mobile phone brings great inconvenience to the one-handed operation, and driving a mobile phone has also become a major cause of traffic accidents. In order to reduce the danger that the driver will bring to the driver when receiving and calling the mobile phone while driving, people invented the car phone clip, which is used to fix the mobile phone on the center console of the car or the air outlet of the air conditioner. However, the existing car holders generally have the disadvantage of unstable clamping. At the same time, they also have the problem of easily pulling the phone clip crooked when pulling the phone out of the phone clip or pulling the phone clip directly out of the air outlet of the air conditioner.

In response to this, designing a stable clip bracket for the air outlet of the automobile air conditioner has become a problem that the industry needs to solve.

SUMMARY OF THE DISCLOSURE

The purpose of the present disclosure is to aim at the defects and deficiencies of the prior art to provide a clip bracket for an air outlet of an automobile air conditioner, which has the advantages of convenient use, simple operation, embodying up and down, front and rear fixation, stable fixation, and high practicability.

In order to achieve the above objective, the technical solution adopted by the present disclosure is to provide a A clip bracket for an air outlet of an automobile air conditioner is provided, comprising: a connecting member; a fixed shell; a guide shaft of which one end is fixedly assembled on the fixed shell and the other end is fixedly assembled on the connecting member; a hook removably assembled on the fixed shell and axially movable only along the guide shaft, and configured to axially fix the clip bracket for an air outlet of an automobile air conditioner to a blade of the air outlet of the automobile air conditioner along the guide shaft; a driving assembly provided on the guide shaft and configured for a user to rotate to drive the hook to axially move along the guide shaft, so as to make the clip bracket for an air outlet of an automobile air conditioner to be axially fixed to the blade along the guide shaft; and a clamping assembly provided on the fixed shell and configured for the user to radially fix the clip bracket for an air outlet of an automobile air conditioner to the blade along the guide shaft.

The driving assembly comprises: a sliding block fixedly assembled on one end of the hook away from the blade and movably assembled to the guide shaft, and configured to axially move along the guide shaft; and a rotating shell sleeved on the sliding block and configured for the user to rotate to drive the sliding block to axially move along the guide shaft.

The clamping assembly comprises: a first clamping member fixedly arranged on the fixed shell; a second clamping member removably assembled on the fixed shell and configured to be in conjunction with the first clamping member for the user to make the clip bracket for an air outlet of an automobile air conditioner to be radially fixed to the blade along the guide shaft; and an elastic member of which one end is assembled on the second clamping member and the other end is assembled on an inner side wall of the fixed shell away from the first clamping member; wherein when the user presses the second clamping member, the second clamping member is separated from the first clamping member, and the second clamping member compresses the elastic member, and when the user releases the second clamping member, the elastic member drives the second clamping member to reset under a driving force of the elastic member, so as to make the clip bracket for an air outlet of an automobile air conditioner to be radially fixed to the blade along the guide shaft.

An inner side wall of the rotating shell and an outer side wall of the sliding block are both provided with threads that engage with each other.

Two symmetrical guide shafts are provided, two slots are correspondingly provided on the sliding block, and the guide shaft is assembled into the slots with clearance.

Limiting posts are provided respectively on both sides of the second clamping member, and the elastic members are sleeved respectively on the limiting posts.

The second clamping member has an approximate "Z" shape.

The first clamping member and the second clamping member are respectively provided with soft pads.

After adopting the above technical solution, the beneficial effects of the present disclosure are as follows.

1. The clip bracket for an air outlet of an automobile air conditioner is firstly moved to the air outlet of the automobile air conditioner, so that the hook extends into the air outlet of air conditioner, and then the second clamping member is pressed upward to separate the second clamping member from the first clamping member. At this time, the second clamping member compresses the spring, and then moves the clip bracket for an air outlet of an automobile air conditioner so that a blade on the air outlet is located between the first clamping member and the second clamping member, and then the second clamping is released. At this time, the elastic member drives the second clamping member to move downward to reset and close to the first clamping member under the driving force of its own, so that the clip bracket for an air outlet of an automobile air conditioner is fixed on the blade up and down.

2. The rotating shell is rotated in one direction, the rotation of the rotating shell drives the sliding block to move toward the side of the rotating shell on the guide shaft, and the movement of the sliding block drives the hook to move toward the side of the rotating shell, so that the hook hooks the blade, thereby embodying the clip bracket for an air outlet of an automobile air conditioner to be fixed on the blade up and down to prevent the clip bracket for an air outlet of an automobile air conditioner from falling off the blade. The present disclosure has the advantages of convenient use, simple operation, embodiment of up and down, front and rear fixation, stable fixation, and high practicability.

3. Both the first clamping member and the second clamping member are provided with soft pads. The arrangement of the soft pads can increase the friction between the clamping assembly and the air outlet blades, and increase the stability of the fixing of the clip bracket for an air outlet of an automobile air conditioner and prevent the clamping assembly from scratching the air outlet blades.

BRIEF DESCRIPTION OF THE DRAWINGS

In order to explain the embodiments of the present disclosure or the technical solutions in the prior art more clearly, the following will briefly introduce the drawings that need to be used in the description of the embodiments or the prior art. Obviously, the drawings in the following description are only are some embodiments of the present disclosure. For those of ordinary skill in the art, other drawings can be obtained based on these drawings without creative labor.

Figure 1:
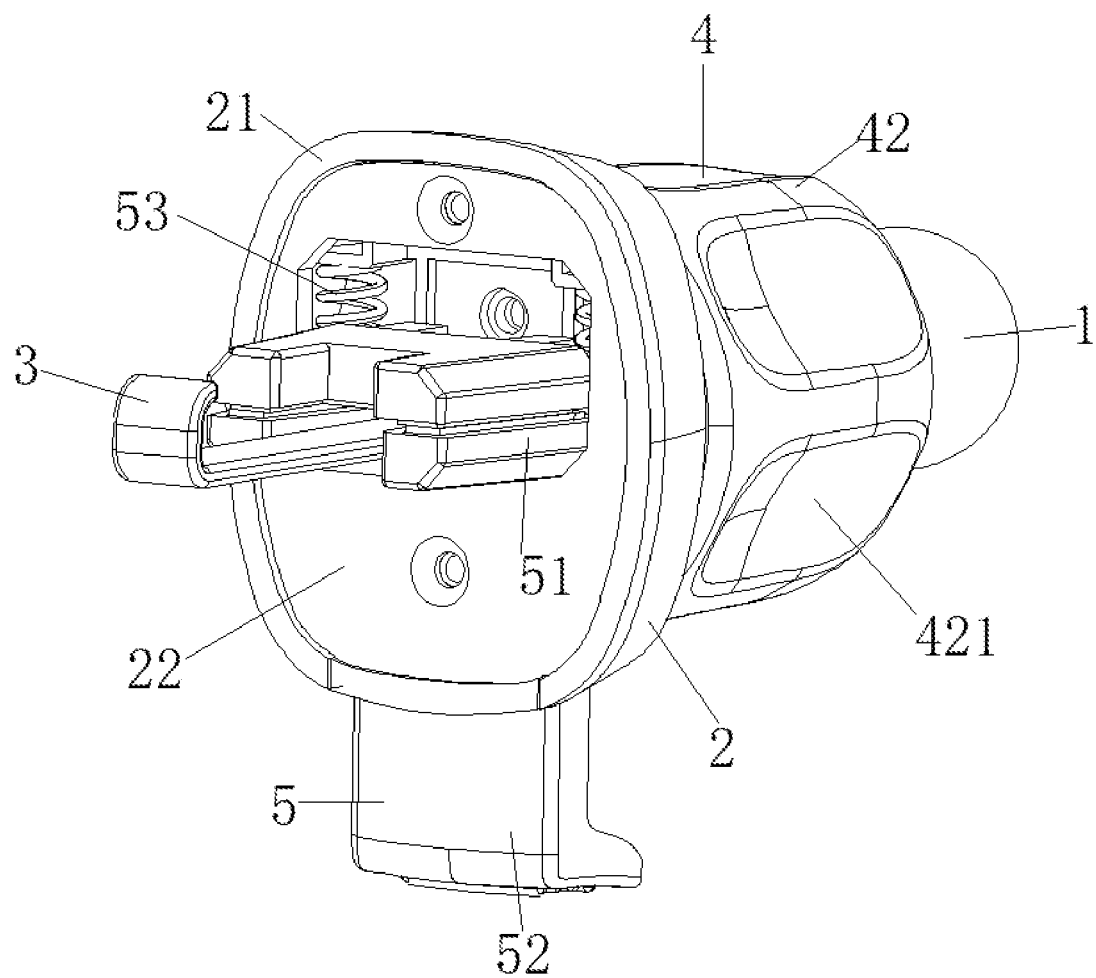
FIG. 1 is a schematic diagram of the structure of the present disclosure.

Reference numeral: 1. connecting member; 2. fixed shell; 3. hook; 4. driving assembly; 5. clamping assembly; 6. guide shaft; 41. Sliding block; 42, rotating shell; 51. first clamping member; 52. second clamping member; 53. elastic member; 411. slot; 521. limiting post; 7. soft pad; 421. limiting slot; 61. protrusion; 21. bottom shell; 22. shell cover; 211. fixed post; 221. through slot; 422. first plug socket; 11. second plug socket; 522. sliding slot.

DETAILED DESCRIPTION OF THE EXEMPLARY EMBODIMENTS

Hereinafter, the present disclosure will be further described in detail with reference to the accompanying drawings.

This specific embodiment is only an explanation of the present disclosure, and it is not a limitation of the present disclosure. After reading this specification, those skilled in the art can make modifications to this embodiment that do not create any contribution as needed, but as long as the rights of the present disclosure, the scope of the requirements is protected by the patent law.

Figure 2:
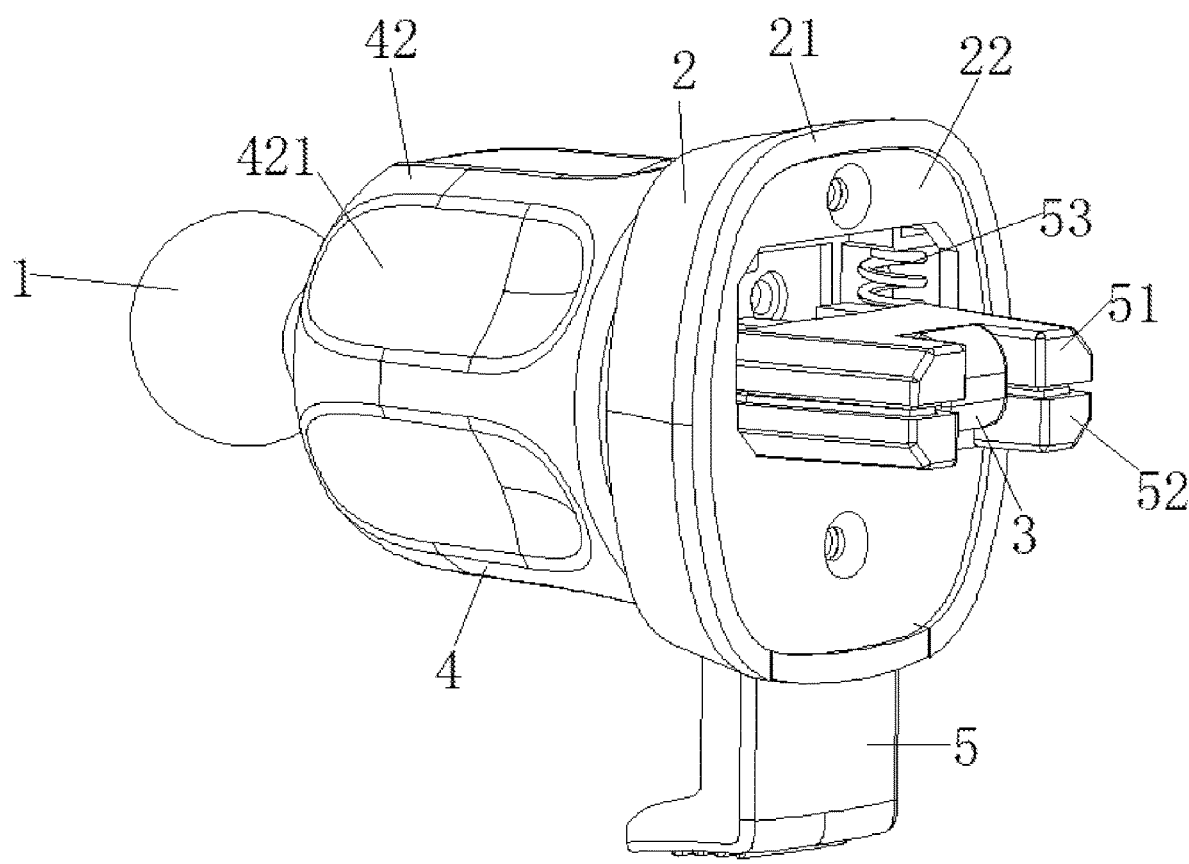
FIG. 2 is a schematic diagram of another structure of the present disclosure.
Figure 3:
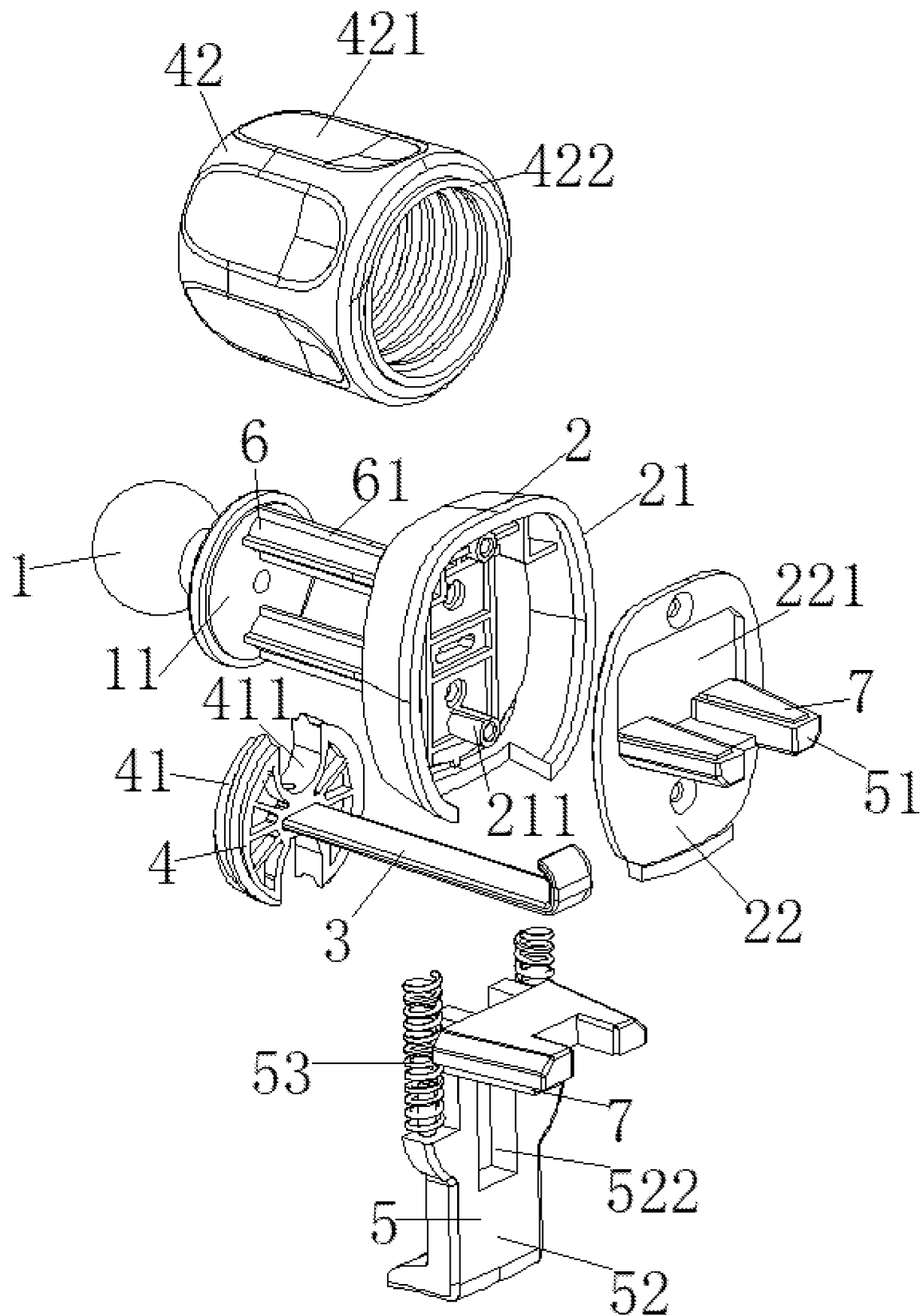
FIG. 3 is an exploded schematic diagram of the present disclosure.
Figure 4:
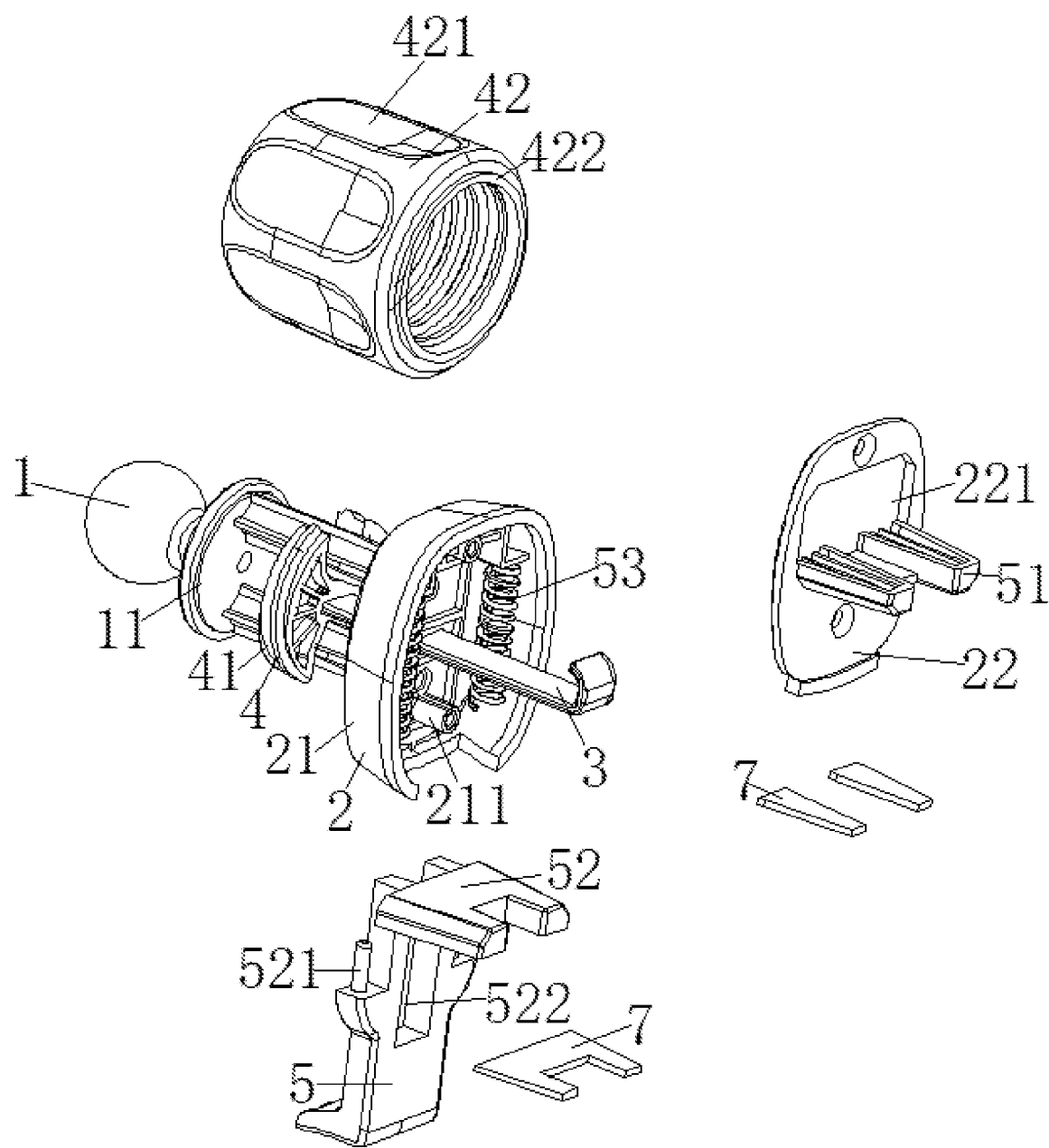
FIG. 4 is another exploded schematic diagram of the present disclosure.

This embodiment relates to a clip bracket for an air outlet of an automobile air conditioner, as shown in FIGS. 1-4, including: a connecting member 1, a fixed shell 2, a guide shaft 6, a hook 3, a driving assembly 4, and a clamping assembly 5.

One end of a guide shaft 6 is fixedly assembled on the fixed shell 2 and the other end is fixedly assembled on the connecting member 1. The hook 3 is removably assembled on the fixed shell 2 and axially movable only along the guide shaft 6, and configured to axially fix the clip bracket for an air outlet of an automobile air conditioner to a blade of the air outlet of the automobile air conditioner along the guide shaft 6. The driving assembly 4 is provided on the guide shaft 6 and configured for a user to rotate to drive the hook 3 to axially move along the guide shaft 6, so as to make the clip bracket for an air outlet of an automobile air conditioner to be axially fixed to the blade along the guide shaft 6. The clamping assembly 5 is provided on the fixed shell 2 and configured for the user to radially fix the clip bracket for an air outlet of an automobile air conditioner to the blade along the guide shaft 6.

Preferably, the connecting member 1 is provided with a connecting hole, and the bracket of the mobile device is fixedly assembled on the clip bracket for an air outlet of an automobile air conditioner through the connecting hole for the user to use.

The driving assembly 4 comprises: a sliding block 41 and a rotating shell 42.

The sliding block 41 is fixedly assembled on one end of the hook 3 away from the blade and movably assembled to the guide shaft 6, and is configured to axially move along the guide shaft 6. The rotating shell 42 is sleeved on the sliding block 41 and configured for the user to rotate to drive the sliding block 41 to axially move along the guide shaft 6.

Specifically, both the inner side wall of the rotating shell 42 and the outer side wall of the sliding block 41 are provided with threads that engage with each other. The rotating shell 42 is provided with a first plug socket 422 on the side adjacent to the fixed shell 2, and the fixed shell 2 is provided with a first plug-in slot for plugging into the first plug socket 422. The first plug socket 422 is plugged into the first plug-in slot, the connecting member 1 is provided with a second plug-in slot 11 on the side adjacent to the rotating shell 42, and the rotating shell 42 is provided with a second plug-in slot on the side away from the first plug-in socket 422. The second plug-in slot 11 is plugged into the second plug-in slot. The arrangement of the first plug socket 422, the first plug-in slot, the second plug socket 11, and the second plug-in slot facilitates the confinement of the rotating shell 42 between the connecting member 1 and the fixed shell 2. A number of limiting slots 421 are provided on the outer side wall of the rotating shell 42, and the limiting slots 421 are evenly arranged on the rotating shell 42, which is convenient for the user to hold and rotate and increase the appearance. In this embodiment, six limiting slots 421 are provided. There are two guide shafts 6 symmetrically provided, and two slots 411 are correspondingly provided on the sliding block 41. The guide shaft 6 and the slots 411 are assembled with clearance to facilitate the sliding of the sliding block 41 on the guide shaft 6. In this embodiment, the slot 411 is a U-shaped slot. In other embodiments, the slot 411 is a combined slot in which the upper part is a rectangular slot and the lower part is a U-shaped slot. The guide shaft 6 is provided with a number of strip-shaped protrusions 61, the protrusions 61 are annularly arranged on the guide shaft 6, and the guide shaft 6 is arranged so that the sliding block 41 is driven by the rotating shell 42 to slide axially along the guide shaft 6 to prevent the sliding block 41 from rotating following the rotation of the rotating shell 42. The clearance between the guide shaft 6 and the slot 411 can reduce the friction between the sliding block 41 and the guide slot, making it more convenient for the user to rotate the rotating shell 42. The hook 3 is a metal hook 3, and the hook 3 can be set to any length. In this embodiment, the hook 3 hooks a blade with a width of less than 35 mm. In other embodiments, the hook 3 can hook a blade with a width greater than 35 mm.

It should be noted that when the rotating shell 42 is rotated, the rotating shell 42 rotates relative to the guide shaft 6, the rotating shell 42 drives the sliding block 41 to move in the axial direction of the rotating shaft, and the sliding block 41 moves to drive the hook 3 to move, thereby embodying the extension of the hook 3 or the fixed shell 2 to be pulled out or retracted, so that the clip bracket for an air outlet of an automobile air conditioner is fixed on the blade back and forth.

Preferably, the clamping assembly 5 comprises: a first clamping member 51, a second clamping member 52 and an elastic member 53.

The first clamping member 51 is fixedly arranged on the fixed shell 2. The second clamping member 52 is removably assembled on the fixed shell 2 and configured to be in conjunction with the first clamping member 51 for the user to make the clip bracket for an air outlet of an automobile air conditioner to be radially fixed to the blade along the guide shaft 6. One end of the elastic member 53 is assembled on the second clamping member 52 and the other end is assembled on an inner side wall of the fixed shell 2 away from the first clamping member 51.

It should be noted that when the user presses the second clamping member 52, the second clamping member 52 is separated from the first clamping member 51, and the second clamping member 52 compresses the elastic member 53, and when the user releases the second clamping member 52, the elastic member 53 drives the second clamping member 52 to reset under a driving force of its own, so as to make the clip bracket for an air outlet of an automobile air conditioner to be radially fixed to the blade along the guide shaft 6.

Preferably, limiting posts 521 are provided respectively on both sides of the second clamping member 52, and the elastic members 53 are sleeved respectively on the limiting posts 521. The second clamping member 52 has an approximate "Z" shape. Both the first clamping member 51 and the second clamping member 52 are provided with a soft pad 7 correspondingly. The arrangement of the soft pad 7 can increase the friction between the clamping assembly 5 and the air outlet blades, and increase the stability of the clip bracket for an air outlet of an automobile air conditioner and prevent the clamping assembly 5 from scratching the air outlet blades. In this embodiment, the elastic member 53 is a spring, in other embodiments the elastic member 53 is an elastic block.

Preferably, the fixed shell 2 includes: a bottom shell 21 and a shell cover 22.

The shell cover 22 is fixedly assembled on the bottom shell 21, the shell cover 22 is provided with a through slot 221, and the first clamping member is fixedly arranged on the shell cover 22 and is located on the inner side wall of the through slot 221. The second clamping member 52 is movably assembled in the bottom shell 21, and one part is arranged outside the bottom shell 21 for user operation, and the other part is penetrated through the through slot 221 and arranged corresponding to the first clamping member 51. The spring is arranged in the bottom shell 21. A fixed post 211 is provided on the inner side wall of the bottom shell 21, and the shell cover 22 is fixed to the fixed post 211 by screws. The second clamping member 52 is provided with a sliding slot 522 slidably assembled on the fixed post 211. In this way, the second clamping member 52 can move up and down in the fixed shell 2.

The working principle of the present disclosure is roughly as follows. When the clip bracket for an air outlet of an automobile air conditioner needs to be used, the clip bracket for an air outlet of an automobile air conditioner is firstly moved to the air outlet of the automobile air conditioner, so that the hook 3 extends into the air conditioner outlet, and then the second clamping member 52 is pressed upwards, so that the second clamping member 52 is separated from the first clamping member 51. At this time, the second clamping member 52 compresses the spring, and then clip bracket for an air outlet of an automobile air conditioner is moved to make a blade on the air outlet locate between the first clamping member 51 and the second clamping member 52, and then the second clamping member 52 is released. At this time, the elastic member 53 drives the second clamping member 52 to move downward to close with the first clamping member 51 under the driving force of its own, so that the car air-conditioning outlet clip bracket is fixed on the blade up and down, and then the rotating shell 42 is rotated in one direction, and the rotating shell 42 rotates to drive the slider 41 toward the rotating shell on the guide shaft 6. 42 moves on one side, the slider 41 moves to drive the hook 3 to move toward the side of the rotating shell 42, so that the hook 3 hooks the blade, so that the clip bracket for an air outlet of an automobile air conditioner is fixed on the blade up and down, then the rotating shell 42 is rotated in one direction, and the rotating shell 42 is rotated to drive the sliding block 41 to move toward one side of the rotating shell 42 on the guide shaft 6, and the sliding block 41 is moved to drive the hook 3 to move toward one side of the rotating shell 42, so that the hook 3 hooks the blade, and the clip bracket for an air outlet of an automobile air conditioner is fixed on the blade up and down, and the clip bracket for an air outlet of an automobile air conditioner is prevented from falling off the blade. The present disclosure has the advantages of convenient use, simple operation, realization of up and down, front and rear fixation, stable fixation, and high practicability.

The above are only used to illustrate the technical solutions of the present disclosure and not to limit them. Other modifications or equivalent substitutions made by those of ordinary skill in the art to the technical solutions of the present disclosure shall be covered, and as long as they do not depart from the spirit and scope of the technical solutions of the present disclosure, they shall be included within the scope of the claims of the present disclosure.

What is claimed is:

1. A clip bracket for an air outlet of an automobile air conditioner, comprising:
   a connecting member;
   a fixed shell;
   a guide shaft of which one end is fixedly assembled on the fixed shell and the other end is fixedly assembled on the connecting member;
   a hook movably assembled on the fixed shell and axially movable only along the guide shaft, and configured to axially fix the clip bracket to a blade of the air outlet of the automobile air conditioner along the guide shaft;
   a driving assembly provided on the guide shaft and configured for a user to rotate to drive the hook to axially move along the guide shaft, so as to make the clip bracket be axially fixed to the blade along the guide shaft; and
   a clamping assembly provided on the fixed shell and configured for the user to radially fix the clip bracket to the blade along the guide shaft.

2. The clip bracket for an air outlet of an automobile air conditioner according to claim 1, wherein the driving assembly comprises:
   a sliding block fixedly assembled on one end of the hook away from the blade and movably assembled to the guide shaft, and configured to axially move along the guide shaft; and a rotating shell sleeved on the sliding block and configured for the user to rotate to drive the sliding block to axially move along the guide shaft.

3. The clip bracket for an air outlet of an automobile air conditioner according to claim 1, wherein the clamping assembly comprises:

a first clamping member fixedly arranged on the fixed shell;

a second clamping member movably assembled on the fixed shell and configured to be in conjunction with the first clamping member for the user to make the clip bracket be radially fixed to the blade along the guide shaft; and an elastic member of which one end is assembled on the second clamping member and the other end is assembled on an inner side wall of the fixed shell away from the first clamping member;

wherein when the user presses the second clamping member, the second clamping member is separated from the first clamping member and the second clamping member compresses the elastic member, and wherein when the user releases the second clamping member, the elastic member drives the second clamping member to reset under a driving force of the elastic member, so as to make the clip bracket be radially fixed to the blade along the guide shaft.

4. The clip bracket for an air outlet of an automobile air conditioner according to claim 2, wherein an inner side wall of the rotating shell and an outer side wall of the sliding block are both provided with threads that engage with each other.

5. The clip bracket for an air outlet of an automobile air conditioner according to claim 4, wherein two symmetrical guide shafts are provided, two slots are correspondingly provided on the sliding block, and the guide shaft is assembled into the slots with clearance.

6. The clip bracket for an air outlet of an automobile air conditioner according to claim 3, wherein limiting posts are provided respectively on both sides of the second clamping member, and the elastic members are sleeved respectively on the limiting posts.

7. The clip bracket for an air outlet of an automobile air conditioner according to claim 6, wherein the second clamping member has an approximate "Z" shape.

8. The clip bracket for an air outlet of an automobile air conditioner according to claim 7, wherein the first clamping member and the second clamping member are respectively provided with soft pads.

\* \* \* \* \*